United States Patent [19]

Gluck

[11] Patent Number: 5,669,773
[45] Date of Patent: Sep. 23, 1997

[54] REALISTIC MOTION RIDE SIMULATOR

[76] Inventor: Lewis Gluck, 14 Fox Run, Wappingers Falls, N.Y. 12590

[21] Appl. No.: 639,872

[22] Filed: Apr. 26, 1996

[51] Int. Cl.⁶ .................................................. G09B 9/00
[52] U.S. Cl. .................... 434/62; 434/29; 434/55; 434/58; 434/59; 474/1; 474/2
[58] Field of Search .................. 434/29, 30, 34, 434/35, 37, 38, 55, 58, 61, 62; 472/59, 60, 130, 131, 137, 1, 2, 27, 34

[56] References Cited

U.S. PATENT DOCUMENTS

| | | | |
|---|---|---|---|
| 4,576,577 | 3/1986 | Lam et al. | 434/58 |
| 5,071,352 | 12/1991 | Denne | 434/58 |
| 5,199,875 | 4/1993 | Trumbull | 434/58 |
| 5,513,990 | 5/1996 | Gluck . | |

*Primary Examiner*—Jerome Donnelly
*Assistant Examiner*—Glenn E. Richman
*Attorney, Agent, or Firm*—Paul J. Sutton

[57] ABSTRACT

A realistic motion ride simulator comprising three stacked tiers pivotally supported by three legs. Each tier can be activated independent of each other while the entire apparatus is moved up and down, tilted laterally, pitched upwardly and downwardly and combinations thereof to simulate the various dynamic forces experienced by riders of a moving vehicle.

10 Claims, 9 Drawing Sheets

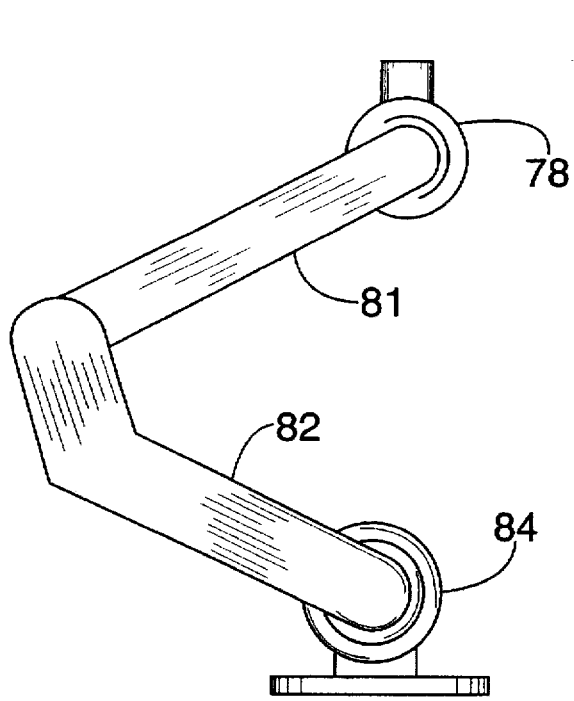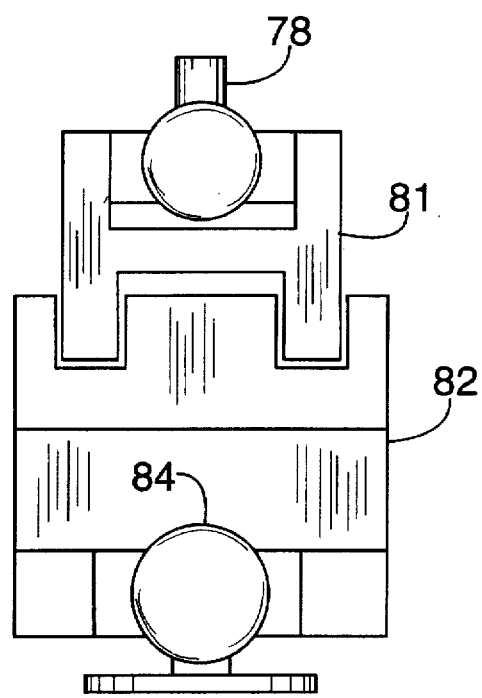
FIG. 8B  FIG. 8A
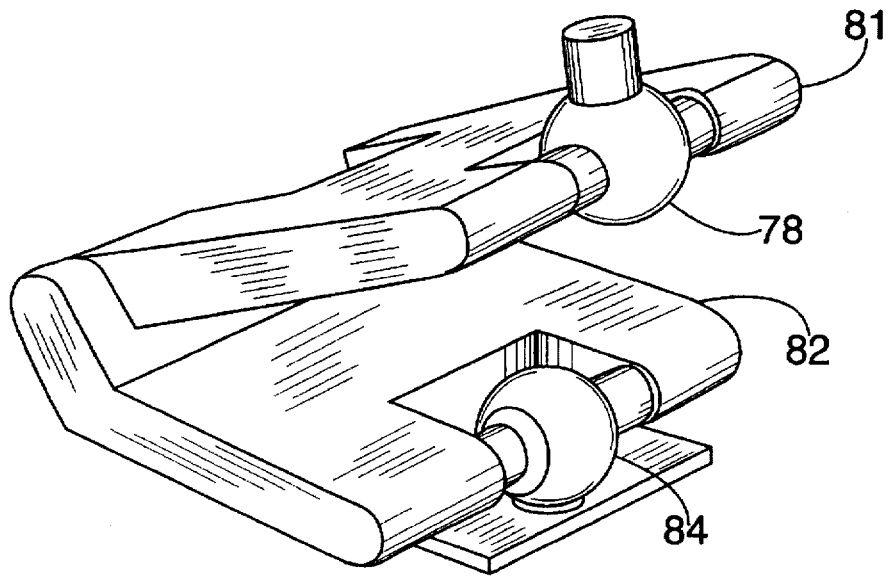
FIG. 8C

REALISTIC MOTION RIDE SIMULATOR

FIELD OF THE INVENTION

This invention relates to simulated ride experiences generally in association with large screen film projections.

BACKGROUND OF THE INVENTION

Prior art ride simulators utilize a group of single seats attached to platforms which are attached to hydraulic rams or linear actuators that pitch and rock the seats according to preprogrammed series of commands. This rapidly expanding field also has utilized adaptations of aircraft flight simulator technology to amusement type of rides.

The passengers or riders have a passive role. They are "along for the ride."

The present invention is an advanced design of a greatly improved hybrid motion simulator. In the present design one or more seat units are provided on a platform. The seat units are generally constructed of high strength composite material and may be moved left or right by hydraulic rams or linear actuators designed to be capable of generating high rates of accelerations. Accelerations of this magnitude are necessary to generate the dynamic forces necessary to obtain the most realistic motion simulation. The seat units, together with their individual lateral linear actuators, are attached to a seat frame which is moved backward and forward by a separate ram or linear actuator. In some applications it may be desirable to have a cabin like structure substantially enclosing all of the seat units and secured to the platform so as to give riders of this apparatus a sense of confinement during their ride.

The seat units move laterally and are bolted to Thompson-style linear bearings riding on hardened steel rails. These rails are attached to the tops of seat support structures that are part of the seat frame.

The seat frame or second tier unit rolls forward and backward at the same high rate of speed as the seats move laterally. This frame unit for the seats is slidably mounted on longitudinally running guides or linear bearings attached to the top of the first tier. Preferably, the frame unit is constructed of a high strength alloy or composite constructed as lightweight as possible to achieve the highest rates of acceleration using the least amount of energy to reverse direction and drive the frame in the desired direction at the appropriately high speed.

The first tier or underlying frame is a vertically moving unit which can move up and down, tilted laterally or longitudinally, pitched upwardly and downwardly and combinations thereof.

It is moved vertically up and down with respect to a floor platform by three hydraulic powered lifting mechanisms spaced generally equidistantly around its perimeter. The hydraulics are controlled by computer controlled valves that are familiar to those in this field. The lifting mechanisms have top portions pivotally mounted to the first tier and lower portions attached to the floor platform.

The geometry and weight distribution of the entire apparatus define a center of mass through which a laterally oriented axis of pitch is created. The axis of pitch is substantially parallel with the front end of the first tier. Preferably, two of the lifting mechanisms are pivotally mounted opposite to each other generally near opposing sides of the platform and along the axis of pitch. The third lifting mechanism is pivotally mounted centrally at the rear of the first tier.

Three force absorbing mechanisms are positioned underneath and along the perimeter of the first tier so as to absorb the dynamic forces generated by the various motions of the apparatus. The top portions of each of these force absorbing mechanisms are pivotally attached to the underside of the first tier and their lower portions are attached to a block slidably attached to the floor platform. Preferably, the pivotal coupling for the lifting mechanisms and the force absorbing mechanisms is realized with a universal coupling attached to the top portions of these devices.

One of the primary advantages of the present design, is that it can operate in spaces under fourteen feet in height in contrast to existing platforms which require extra large spaces up to twenty-five feet in height to accommodate the up and down, and tilting motions.

An important benefit of the main platform having free movement in multiple axes—pitch and roll—is that it allows for a wide variety of realistic motion simulation. Motions such as simulating a boat hitting waves, riding on a cobble stone road, hitting pot holes, or bouncing down stairs can be easily simulated with this apparatus. This would make particularly good use of Trumbull's motion simulation technology shown as U.S. Pat. No. 5,199,875, Trumbull. By activating the lifting mechanisms in synchronism, or in opposition to each other, a multitude of physical sensations can be induced.

The motion simulation platform of the present invention is generally used in a theatrical setting with a large fixed screen and projector located above and towards the rear of the motion platform. The screen is preferably shaped in the form of a truncated section of a hemisphere as illustrated in U.S. Pat. No. 4,634,384, NEVES, ET AL, Jan. 6, 1987.

The purposes of this motion platform is to create the illusion that the passengers are seated in a rapidly traveling and maneuvering vehicle. This is accomplished by applying forces to the passengers in synchronism with a display of the projected image to fabricate gravitational sensations or onset cues of the movements being projected on the screen.

Thus, when the projected image depicts a scenario that the vehicle is turning to the right, the lifting mechanisms operate in concert with each other to tilt the underlying platform to the right and simultaneously the seat unit ram drives the seats in the same direction to simulate the centrifugal forces resulting from the vehicle turning to the right.

Also, in the image suggestive vehicle, accelerating and decelerating the first tier is achieved by pitching the first tier upwardly or downwardly depending upon the direction to be simulated, and the second tier ram drives the second tier forward or backward to simulate that acceleration force component. There are existing systems which train pilots that program the motion of simulator platforms in relationship with image(s) projected on a visual display through the use of some type of control feedback system. In the case of the present invention, the complex control feedback usually necessary to actively link the motions of the flight training simulator to the film display is eliminated.

One of the principal advantages of this hybrid design is that the onset cues can be programmed separately from programming the simulation of acceleration, deceleration and centrifugal forces. This allows for a greater refinement of the simulation than is possible with simulators that rely solely on pitching, yawing, and thrusting for their force simulation. Similarly, simulators that move strictly orthogonally, which predominantly rely on visual cues or revisions from the projection image to suggest onset motion cues, cannot simulate motions with the same degree of refinement as the present invention.

Another advantage is that because of the realistic motion simulation, the motion program can be adapted to almost any film. Other simulators require the film to be shot with the limitations of the platform in mind.

One of the most important advantages of the present invention is that the lifting mechanisms are very low in height which permits a low profile simulator structure to be employed. This feature expands the number of locations in existing theaters in which the device may be employed without the extreme expense and inconvenience of remodeling or the new construction of suitable space to accommodate the simulator.

SUMMARY OF THE INVENTION

In accordance with the present invention, a realistic motion ride simulator is provided with a substantially lower height profile than ride simulators of its type developed up to this date. Due to its unique construction, the current simulator associated with film images provides the rider with onset cues and accelerated motions in all planes together with tilting and banking. It is thus able to provide the patron with the most realistic sensations of the simulated ride experience yet developed.

Because of the low profile, the device is able to be erected in many more existing building structures without the need for extensive structural modifications. As indicated, however, it provides much more extensive complex motions and onset cues than any existing simulator of this type.

The structure comprises three stacked tiers or platforms each independently actuated to provide realistic motion sensations and accelerations. The first or lower tier comprises a base platform of generally rectangular shape mounted pivotally and supported by three lifting mechanisms. Two of the lifting mechanisms are mounted opposite to each other on either side of the first tier preferably along a defined axis of pitch. A third lifting mechanism is centrally located at the rear of the first tier. A significant amount of height is conserved because the lifting mechanisms can be folded to a minimum height thus allowing this apparatus to be installed and operated in spaces of relatively low height. With appropriate programming known to the art, these lifting mechanisms may impart pitch and roll to the platform up to at least 20 degrees as well as up and down motions and combinations thereof, i.e., a downward tilt to the right or an upper tilt to the right and/or left, etc.

Located underneath the first tier are three force absorbing devices spaced around the perimeter of the first tier so as to maximally absorb the various dynamic forces generated by the complex motions of the apparatus. These devices have arms pivotally attached to the underside of the first tier allowing them to resist heavy lateral, stress or other dynamic forces. The arms also move up and down in concert with the first tier.

The pivotal attachments for the force absorbing devices and the lifting mechanisms are realized with universal joints such as those shown in the drawings or a Heim or Cardian type universal joints shown in U.S. Pat. No. 5,018,973, Alet et al.

Various types of designs for force absorbing devices such as those similar in design to the lifting mechanisms can be used. Also, the force absorbing devices can be designed as scissor brackets or hinged legs whose lower portions and upper portions are pivotally connected to the floor platform and the first tier respectively.

Another embodiment of the present invention uses reinforced supporting legs capable of raising and lowering the structure while simultaneously absorbing the dynamic forces generated by the various motions of the structure thus eliminating the need for separate force absorbing devices. These legs are pivotally attached to the first tier to allow the same amount of degree of movement as with the lifting mechanisms.

Running longitudinally in the center of the first tier is a rectangular recess within which a ram is mounted which is secured to the second tier by brackets. The second tier, which comprises a frame structure with a plurality of seat supports, is mounted on mechanical interface means that communicate with the first and second tiers for allowing the second tier and first tier to move forward and backward or longitudinally with respect to each other. Preferably, the interface means includes longitudinally running guides or linear bearings straightforwardly and angularly mounted to the top surface of the first tier. The angularly mounted guides are positioned so as to resist the lateral forces generated by the third tier.

The second tier has a plurality of rails that frictionally engage with the guides to realize the longitudinal motions of the first and second tiers with respect to each other. The seat supports have parallel lateral rails running across their tops and affixed thereto.

A plurality of rows of seat units comprise the upper platform or third tier. The seat units have linear bearings attached to their bases. The seat units are mounted to the seat supports of the second tier so that the linear bearings of the seat units engage with the rails of the seat supports thus allowing the seat units and the second tier to move laterally or left and right with respect to each other. A laterally mounted ram is secured to the second tier and to the base of each row of seat units which on cue moves these seat units laterally. Each of these rams is mounted within the base of a row of seat units and therefore do not themselves add any additional height to the structure. Similarly, the forward acceleration and deceleration ram does not add to the overall height of the structure since it is mounted in a rectangular recess of the first tier. A generally cabin shaped structure can be attached to the third tier so as to enclose the seat units of the third tier while still allowing the riders to have a full view of the screen.

The rams of each tier of the structure are capable of providing high rates of acceleration, thus imparting realistic sensations to the rider that have not been attainable with previous ride simulators. These rams can be powered hydraulically, mechanically, electrically or combinations thereof or in any other manner known to those of ordinary skill in this field.

Thus the invention comprises a ride motion simulator for a plurality of riders comprising a floor platform, and a first tier located above the floor platform. A plurality of lifting mechanisms, each having a lower portion and an upper portion, such that said each lifting mechanism raises and lowers the first tier with respect to the floor platform wherein each lower portion is secured to the floor platform and each upper portion is attached to the first tier. The raising and lowering of the first tier is effected by a first actuator means. A second tier is slidably mounted on top of the first tier. The second tier includes a plurality of support means for carrying the riders. An interface means communicating with the first and second tier allows the second tier and first tier to move longitudinally with respect to each other. There is a second actuator means attached to the first and second tiers for effecting the longitudinal motion. A third tier is slidably mounted on top of the support means wherein the third tier is occupied by the riders. There are rail means running across the support means and affixed thereto that allow the third and second tiers to move laterally with respect to each other. There is a third actuator means attached to the second and third tiers for effecting the lateral motion. There is a plurality of force absorbing members each having a lower portion attached to the floor platform and an upper portion attached to the first tier wherein the first tier is moveable up and down, pitchable up and down, and tiltable right and left and combinations thereof independent of the lateral motion of the second and third tiers with respect to each other and the longitudinal motion of the first and second tiers with respect to each other.

It is desirable that the structure be fabricated from metal alloys or composites strong enough to resist the stress imparted to the structure, but as light as prudently possible to obtain the desired degrees of acceleration and minimize the necessity of reinforcing floor structures in buildings in which the devices are erected.

BRIEF DESCRIPTION OF THE DRAWINGS

In the accompanying drawing which forms a part of this specification:

FIGS. 8A, B and C show the front, side and perspective views of a hinged braced design which can be used as a force absorbing device.

ILLUSTRATIVE SPECIFIC EMBODIMENT

Figure 1:
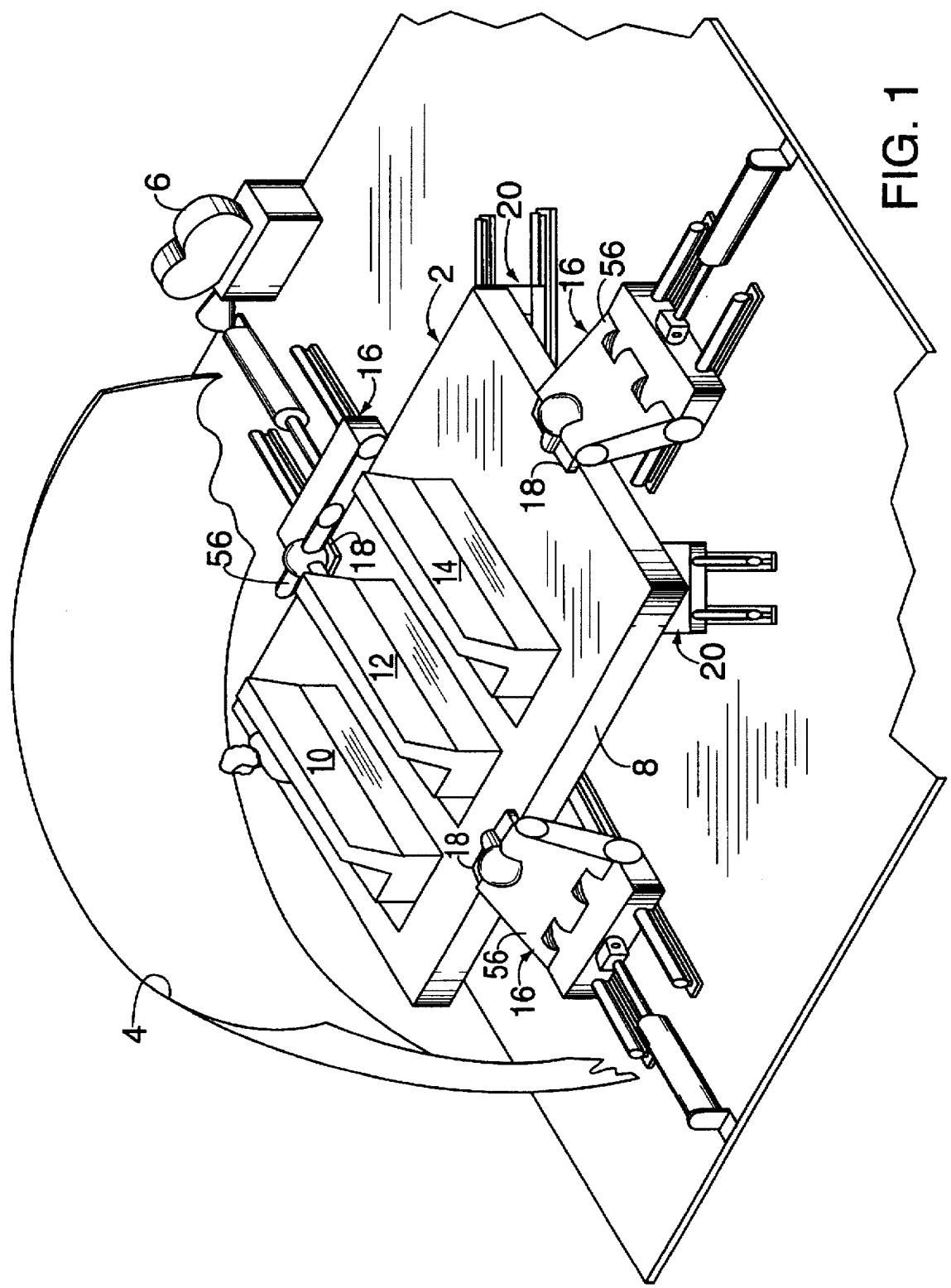
FIG. 1 is an overall perspective view of the apparatus of the present invention if placed in front of a viewing screen for images for a projector.

Referring to the accompanying drawing in FIG. 1, the apparatus 2 of the present invention is shown being supported by floor platform 1 and positioned relative to a viewing screen 4 onto which the images are projected by a projector device 6. In the apparatus illustrated, three rows of riders seats are shown at 10, 12 and 14 respectively, as the upper or third tier. The seats are supported by a first or lower tier 8.

Figure 6:
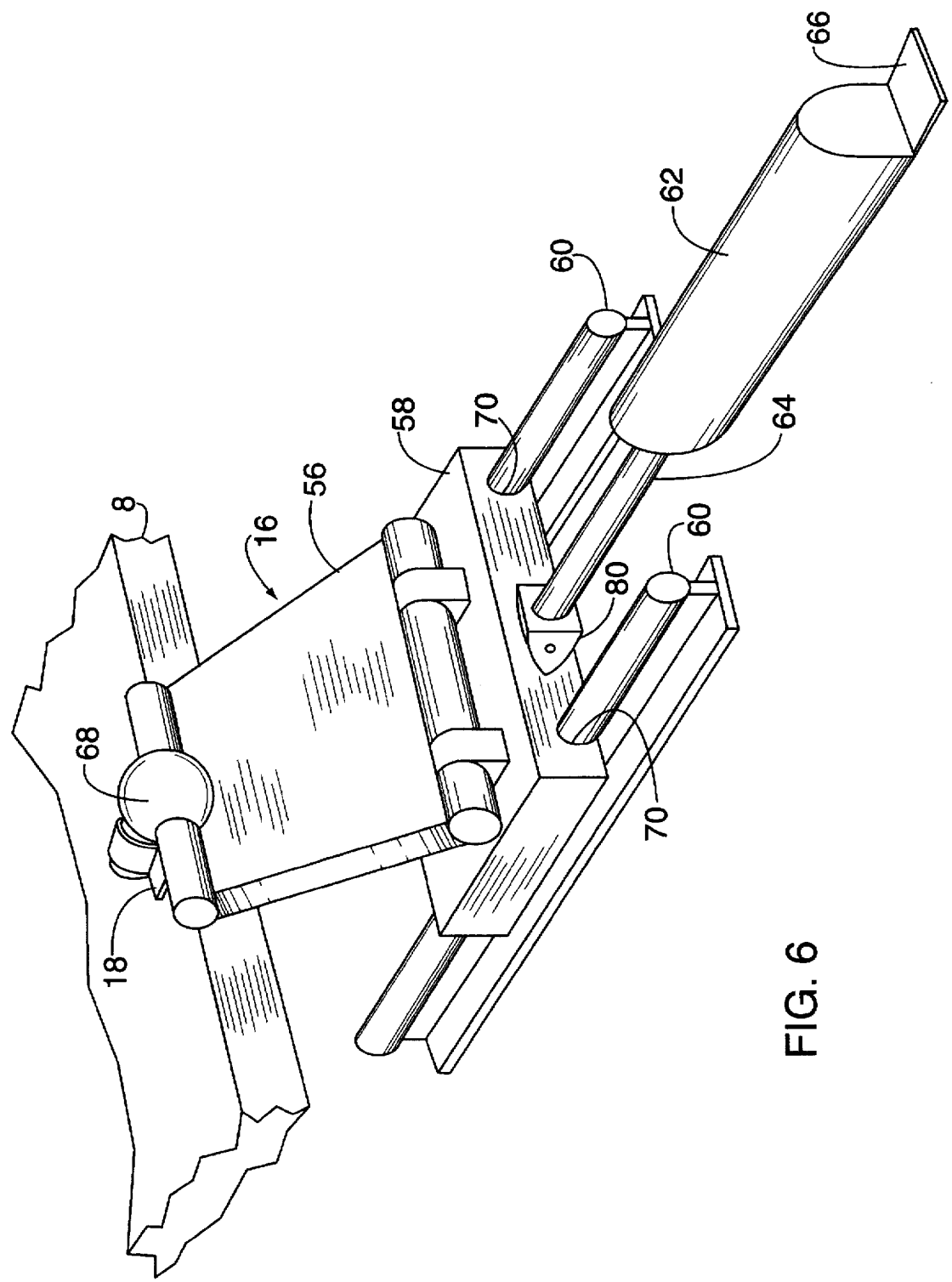
FIG. 6 is an exploded perspective view of a lifting mechanism attached to the first tier.

The lower tier 8 is mounted on three lifting mechanisms 16 secured to the floor platform 1. Two of the lifting mechanisms 16 are mounted at the forward sides of first tier 8 and a third is mounted at the rear. The arms 56 of lifting mechanisms 16 are pivotally secured to the first tier 8 with the use of bracket 18. The brackets 18 are mounted on the top surface of first tier 8 which permits a lower profile simulator structure to be employed. The pivotal connections to tier 8 are done with universal joints 68. FIG. 6 shows a close up perspective view of lifting mechanism 16 comprising two parallel linear rails 60 secured to floor platform 1. Base member 58 has linear bearings 70 which slidably engage with the linear rails 60. Arm 56 is rotatably attached to base member 58. Universal coupling 68 is attached to the upper end of arm 56 and is secured to the top surface of first tier 8 with bracket 18. Ram 62 has a piston 64 secured to the rear of base member 58 with ram bracket 80. Ram 62 is secured to floor platform 1 with L-bracket 66.

Figure 2:
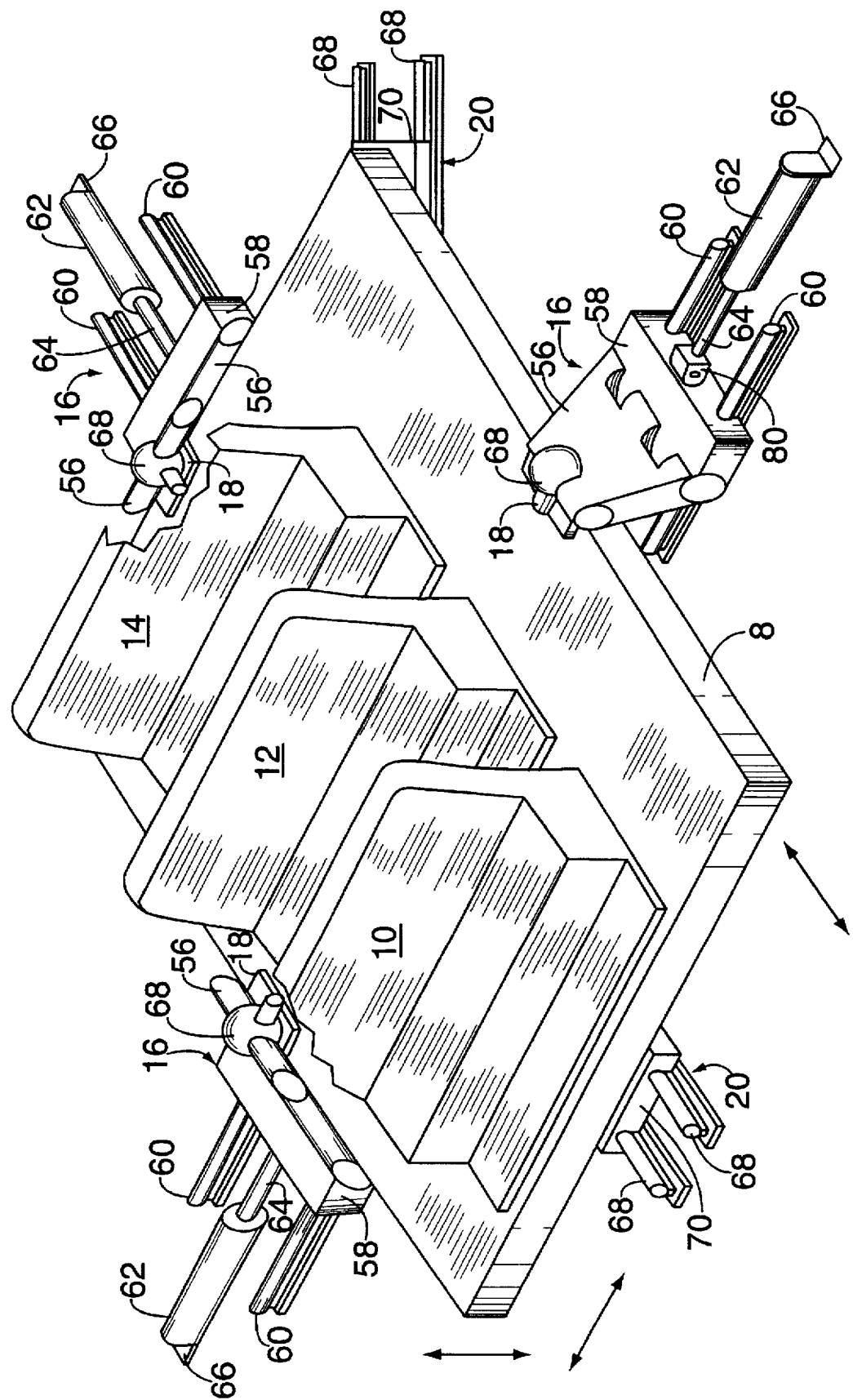
FIG. 2 is a perspective view of the apparatus itself with arrows indicating the motions along primary three axes and portions of the seat units cut out to expose the lifting mechanisms.
Figure 7:
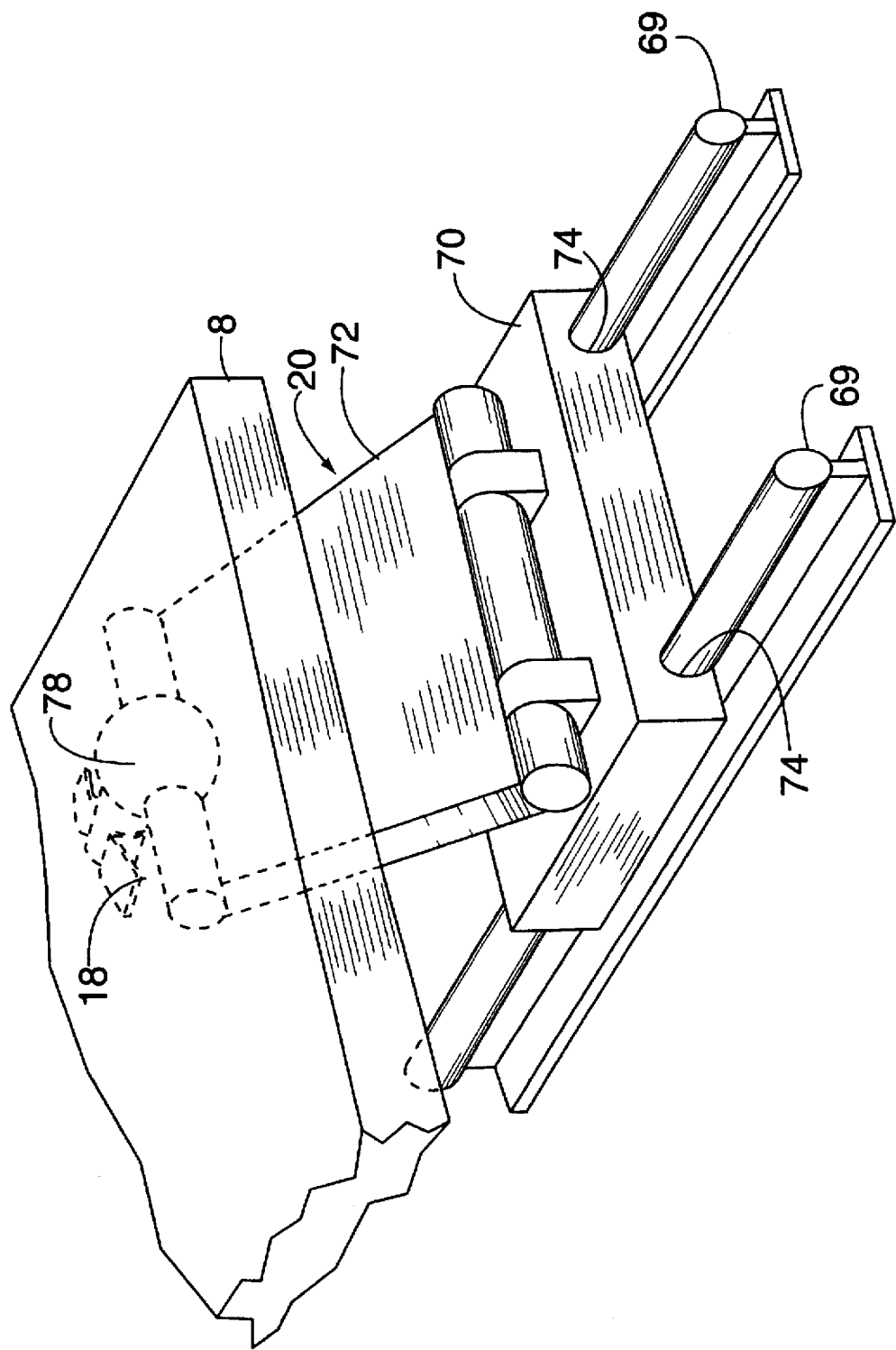
FIG. 7 is an exploded perspective view of a force absorbing member attached to the underside of the first tier.

Shown in FIG. 2 are the two lifting mechanisms 16 mounted opposite to each other. Also shown are two of the three force absorbing devices 20 pivotally attached to the underside of first tier 8. The force absorbing devices 20 are secured to the underside of first tier 8 with the use of bracket 18 as shown in FIG. 7. FIG. 7 shows a close up view of force absorbing device 20. Force absorbing device 20 comprises parallel rails 69 secured to floor platform 1. Block 70 has corresponding linear bearings 74 that slidably engage with the linear rails 69. Arm 72 is rotatably attached to block 70. Universal coupling 76 is attached to upper end of arm 72 as shown. Another design of a force absorbing device is shown in FIG. 8. The device is a hinged scissor bracket comprising an upper leg 81 hingedly connected to a lower leg 82. Universal couplings 78 and 84 are connected to the upper and lower legs respectively.

Figure 3:
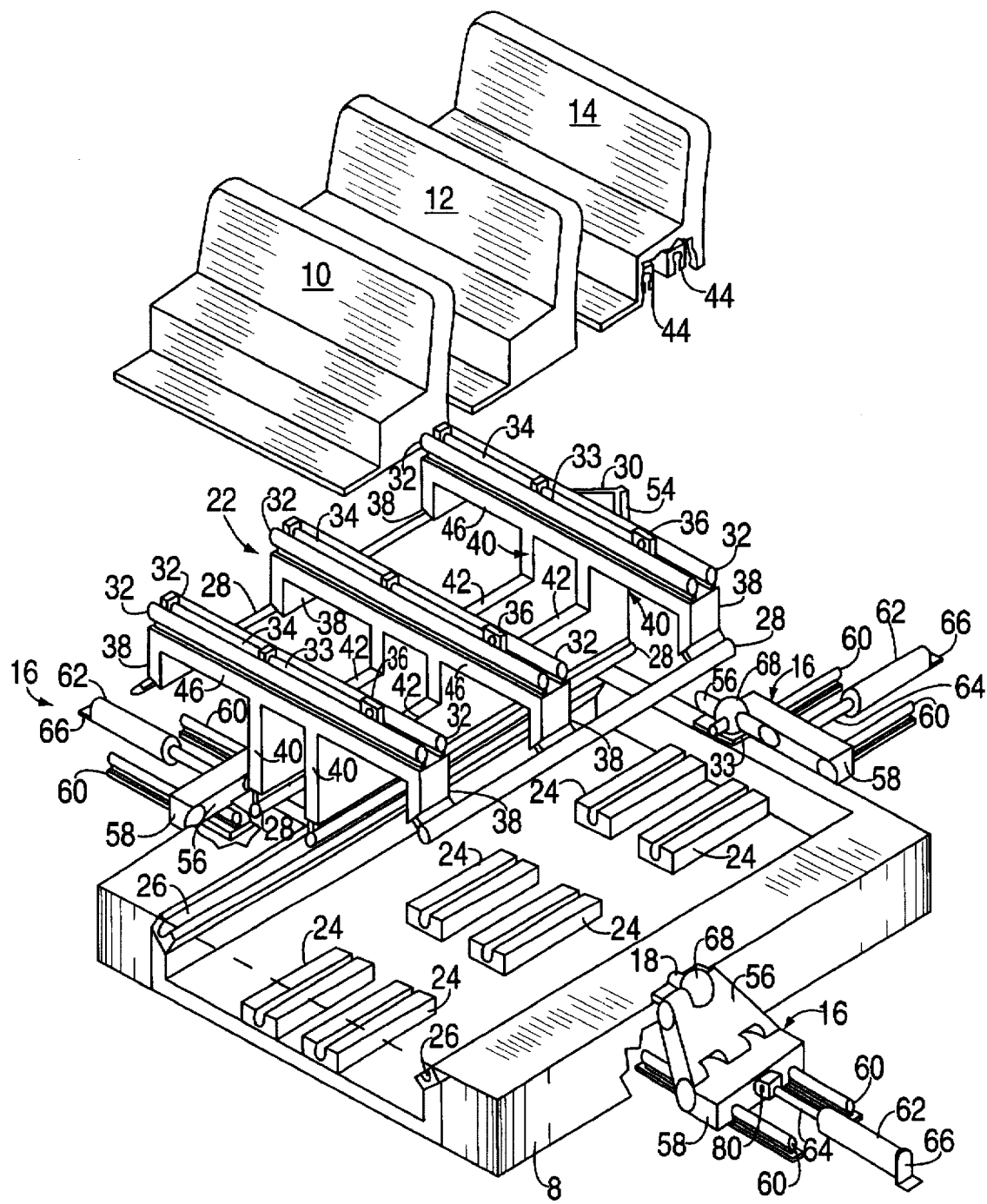
FIG. 3 is a perspective exploded view showing the three tiers with portions of the first tier removed to reveal how the three tiers interconnect to each other.

FIG. 3 shows the relationship between first tier 8, the second tier 22 and the upper tier comprising seat units 10, 12 and 14. The relationship between the first tier 8 and the middle tier framework 22 with seat support structures 46 is clearly shown. The seat frame structure 22 has laterally positioned parallel seat supports 46. The seat supports 46 have extending downwardly therefrom outer frame legs 38 and central legs 40. Central legs 40 extend downwardly and are formed into longitudinal beams 42. Linear rails 28 are secured to the longitudinal beams 42. Also, linear rails 28 are secured longitudinally and angularly to outer frame legs 38 as shown. Linear bearings 24 are attached straightforwardly to first tier 8 so as to be in alignment with and engage with the linear rails 28 that are secured to longitudinal beams 42. Linear bearings 26 are angularly attached to first tier 8 so as to be in alignment with and engage with the linear rails 28 that are angularly secured to outer frame legs 38.

Also shown in FIG. 3 is the positioning of rails 32 on the seat supports 46. A hydraulic ram 34 with piston 33 is mounted between the rails 32 and secured to seat support 46. A bracket 36 is secured at the end of the piston 33 and engages a corresponding linkage not shown on the underside of seat units 10, 12 and 14. Linear bearings 44 are attached to the underside of seat units 10, 12 and 14 so as to engage with the rails 32. The hydraulic rams 34 together with pistons 33 extending in and out move the respective seats 10, 12 and 14 laterally with respect to seat frame structure 22 upon a cue command.

Figure 5:
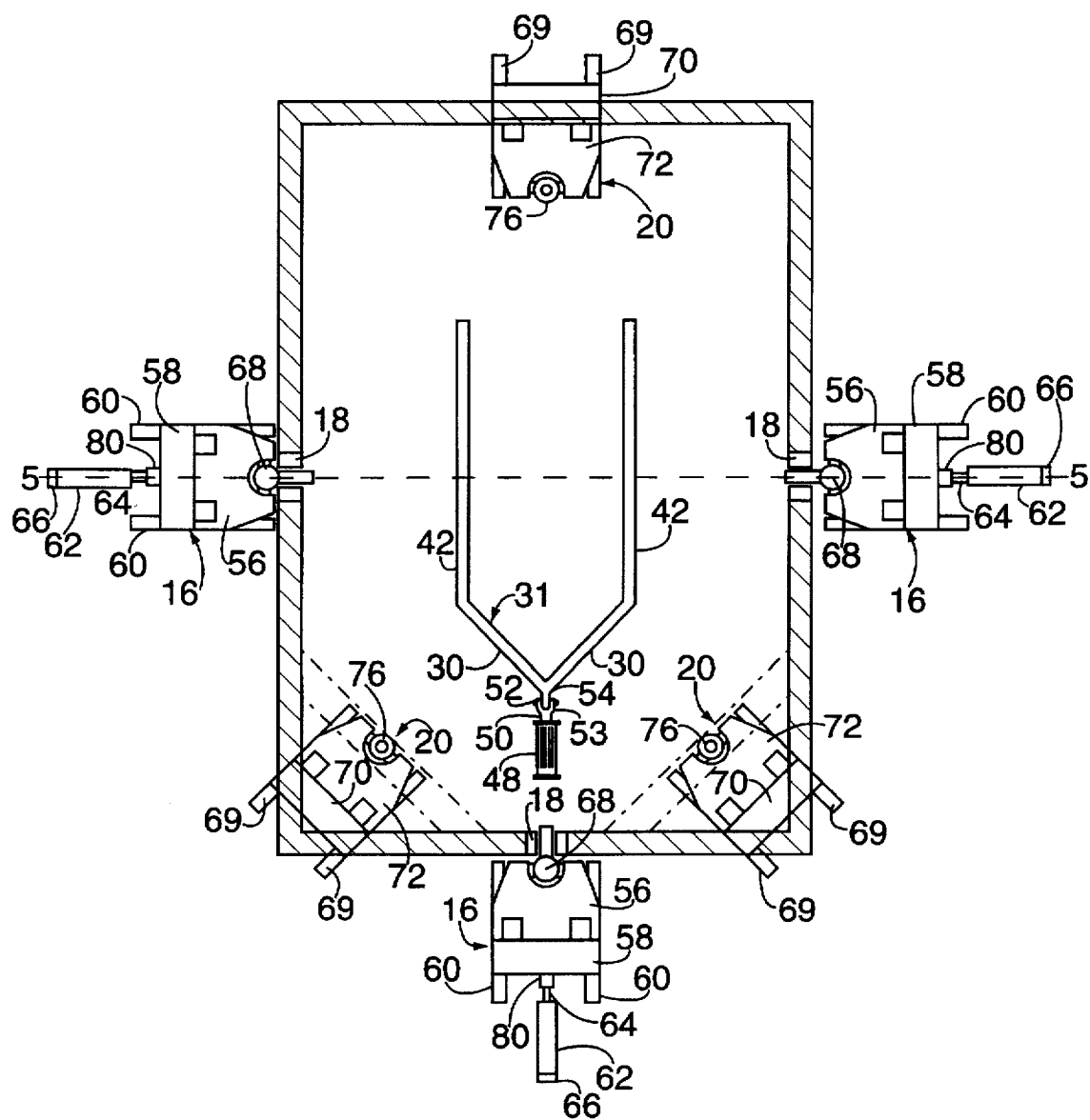
FIG. 5 is a top view of the structure with the third tier and seat supports of the second tier removed depicting the relative positioning of the force absorbing devices with the two side lifting mechanisms connected to the first tier along the axis of pitch shown as line 5—5. Also shown is the connection between the seat frame unit and the ram mounted in a rectangular recess in the first tier.

The forward and backward motion of the second tier 22 with respect to the first tier 8 is obtained by the action of the ram 48 and piston 50 mounted axially at the rear section of tier 8 as shown in FIG. 5. As is clearly shown in FIG. 5, the outer end of piston 50 is fitted with a bracket 53 and pin 52 that are used to connect ram 48 to the back end 54 of the Y bar 31. The Y bar 31 has arms 30 that are attached to central legs 40 and longitudinal beams 42 as shown in FIGS. 3 and 5. FIG. 5 also shows the relative positioning of the lifting mechanisms 16 and the force absorbing devices 20 wherein two of the force absorbing devices are positioned on opposite sides of first tier 8 along the axis of pitch shown as line 5—5.

Figure 4:
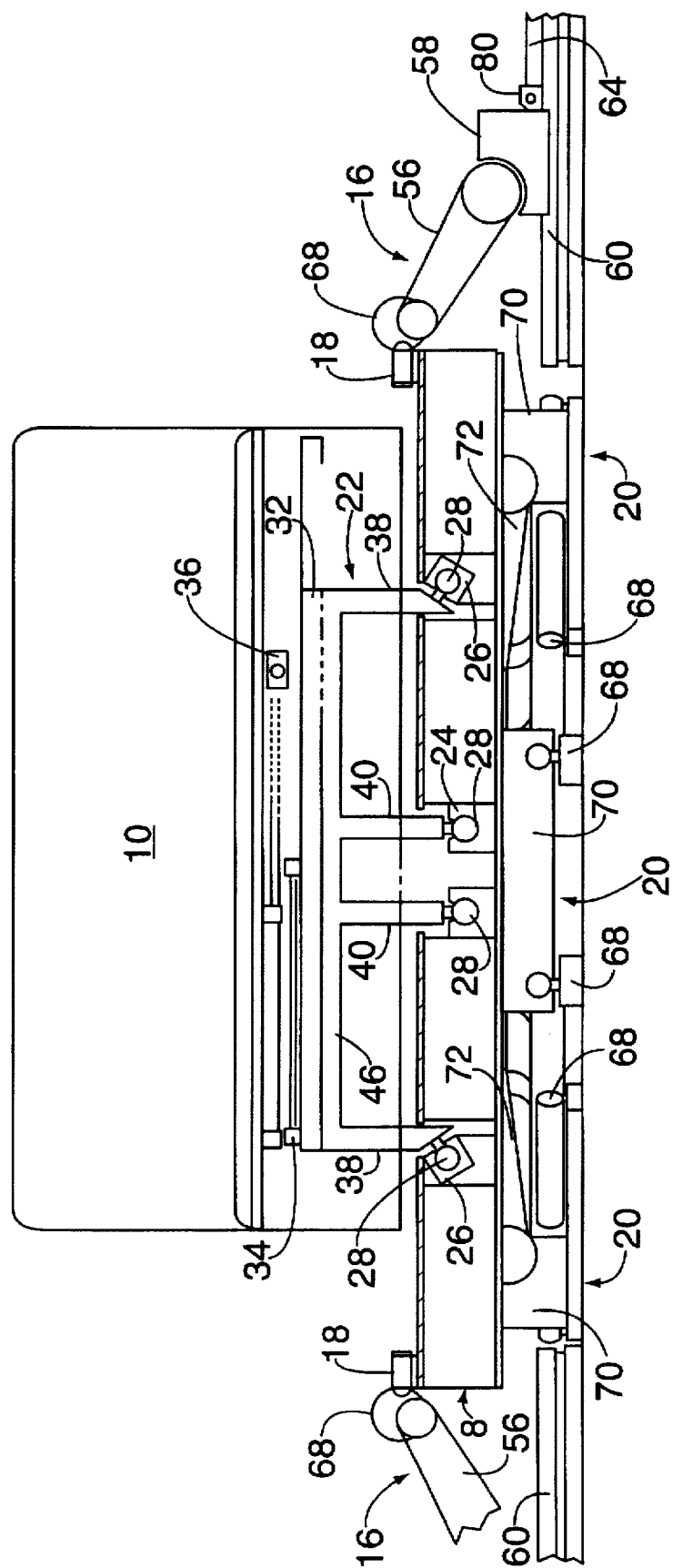
FIG. 4 is a front plan view of the structure showing the interface between the first and second tiers.

FIG. 4 shows a force absorbing member 20 located centrally at the front of tier 8 and two other force absorbing members 20 located at the corners of the rear portion of tier 8. The engagement of the rails 28 with the bearings 26 and 24 is clearly shown.

Figure 9:
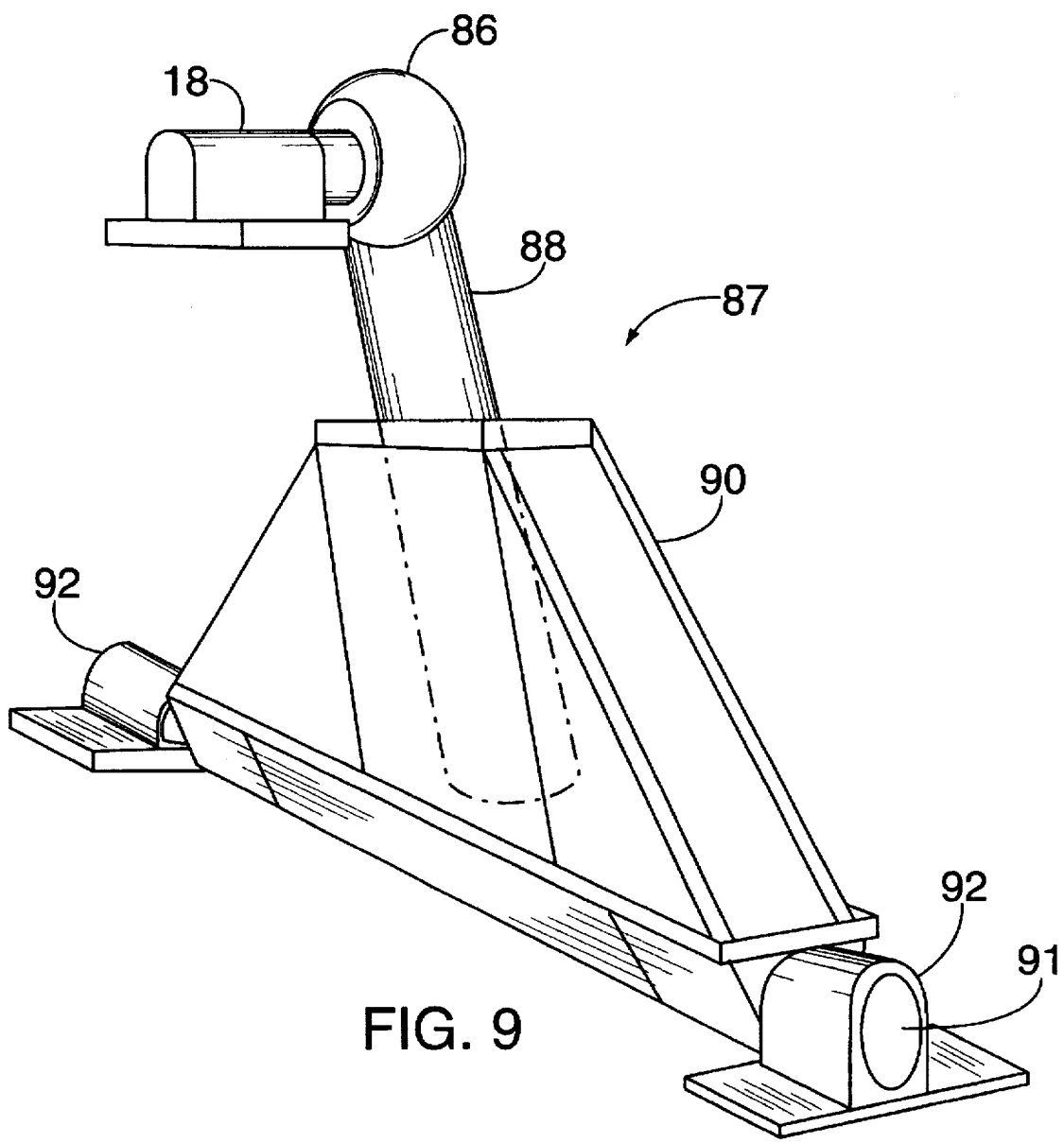
FIG. 9 shows a leg that can be used to support the structure while simultaneously absorbing the stress, lateral and other dynamic forces generated by the complex motions of the ride simulator.

FIG. 9 shows a supporting leg which is used to not only support the structure but also serves to absorb lateral and stress forces thus eliminating the need for separate force absorbing members 20. The supporting leg 87 comprises a hydraulic ram 88 attached to and located within reinforcement structure 90. The reinforcement structure 90 has axle 91 which is inserted through pillow block bearings 92. Attached to the upper end of ram 88 is universal coupling 86. The supporting leg 87 is attached to first tier 8 with bracket 18.

The device of the present invention provides a significantly improved ride simulator that can be assembled in compact space and requires a much lower profile space than the simulators presently available because of the way in which the lower platform and middle platforms are designed. Further, since each tier of the three tiers can be provided with on set cues and accelerations independently of the other, a much more realistic ride sensation is available with more of the onset cues available from physical cues instead of relying upon visual image cues as is the case for most currently operated ride simulators.

The programming of the cues and the means for operation and control of the actuators is known to the art and does not form part of the present invention.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. A ride motion simulator for a plurality of riders comprising:

a floor platform, a first tier located above the floor platform;

a plurality of lifting mechanisms, each having an upper portion and a lower portion, wherein the upper portion is attached to the first tier and the lower portion is attached to the floor platform such that said each lifting mechanism raises and lowers the first tier with respect to the floor platform;

first actuator means attached to the lifting mechanisms for effecting the raising and lowering of the first tier with respect to the floor platform;

a second tier slidably mounted on top of the first tier wherein the second tier includes a plurality of support means for carrying the riders;

interface means communicating with the first tier and second tier for allowing the second tier and first tier to move longitudinally with respect to each other;

second actuator means attached to the first tier and second tier for effecting the longitudinal motion;

a third tier is slidably mounted on top of the support means wherein the third tier is occupied by the riders;

rail means running across the support means and affixed thereto for allowing the third tier and second tier to move laterally with respect to each other;

third actuator means attached to the second and third tiers for effecting the lateral motion and;

a plurality of force absorbing members each having a lower portion attached to the floor platform and an upper portion attached to the first tier where the first tier is moveable up and down, pitchable up and down, and tiltable right and left and combinations thereof independent of the lateral motion of the second and third tiers with respect to each other and the longitudinal motion of the first and second tiers with respect to each other.

2. The ride motion simulator of claim 1 wherein the first actuator means is a retractable and extensible ram having one end attached to the lifting mechanism and another end attached to the floor platform.

3. The ride motion simulator of claim 1 wherein the second actuator means is a retractable and extensible ram having one end attached to the first tier and another end attached to the second tier.

4. The ride motion simulator of claim 1 wherein the third actuator means is a retractable and extensible ram having one end attached to the second tier and another end attached to the third tier.

5. The ride motion simulator of claim 1 wherein the first interface means comprises: a plurality of guides running longitudinally along the first tier and affixed straightforwardly and angularly thereto and a plurality of rails attached to the second tier and slidably engaged to the guides such that the second tier and first tier move longitudinally with respect to each other when the second actuator means is activated.

6. The ride motion simulator of claim 1 wherein the rail means comprises a plurality of rails running across the support means and affixed thereto and a plurality of bearings attached to the third tier and slidably engaged to the rails such that the third tier and second tier move laterally with respect to each other when the third actuator means is activated.

7. The ride motion simulator of claim 1 wherein the third tier is a plurality of seat units.

8. The ride motion simulator of claim 1 wherein the lifting mechanism comprises:

linear parallel rails attached to the floor platform;

a base with a rear portion wherein the base is slidably engaged to the linear parallel rails and the rear portion is attached to the first actuator means and an arm having a lower end and an upper end wherein the lower end is rotatably attached to the base and the upper end is pivotally attached to the first tier such that when the first actuator means is activated the base is pushed forward or pulled backward along the rails causing the arm to rotate upward or downward respectively raising or lowering the first tier.

9. The ride motion simulator of claim 1 wherein the force absorbing member comprises:

linear parallel rails attached to the floor platform;

a block having linear bearings attached thereto so as to slidably engage with the rails and an arm having a lower portion and an upper portion where the upper portion is pivotally attached to the first tier and the lower portion is rotatably attached to the block so as to follow the motions of the first tier thus absorbing the forces generated by such motions.

10. A ride motion simulator for a plurality of riders comprising:

a floor platform;

a first tier located above the platform;

a plurality of legs, each having an upper portion and a lower portion, wherein the upper portion is attached to the first tier and the lower portion is attached to the floor platform such that each leg raises and lowers the first tier with respect to the floor platform;

first actuator means attached to the legs for effecting the raising and lowering of the first tier with respect to the floor platform;

a second tier slidably mounted on top of the first tier including a plurality of support means for carrying the riders, interface means communicating with the first tier and second tier for allowing the second tier and first tier to move longitudinally with respect to each other;

second actuator means attached to the first tier and second tier for effecting the longitudinal motion;

a third tier slidably mounted on top of the support means wherein the third tier is occupied by the riders;

rail means running across the support means and affixed thereto for allowing the third tier and second tier to move laterally with respect to each other;

third actuator means attached to the second and third tiers for effecting the lateral motion and;

the first tier being moveable up and down, pitchable up and down, tiltable right and left and combinations thereof independent of the lateral motion of the second and third tiers with respect to each other and the longitudinal motion of the first and second tiers with respect to each other wherein said motions generate dynamic forces that are absorbed by the legs.

* * * * *